(12) United States Patent
Pradeep (10) Patent No.: US 10,015,629 B2
(45) Date of Patent: Jul. 3, 2018

(54) SYSTEM AND METHOD FOR FACILITATING SOCIAL DINING EXPERIENCES USING LOCATION INFORMATION

(71) Applicant: Anantha Pradeep, Piedmont, CA (US)

(72) Inventor: Anantha Pradeep, Piedmont, CA (US)

( * ) Notice: Subject to any disclaimer, the term of this patent is extended or adjusted under 35 U.S.C. 154(b) by 29 days.

(21) Appl. No.: 15/217,876

(22) Filed: Jul. 22, 2016

(65) Prior Publication Data

US 2018/0027375 A1 Jan. 25, 2018

(51) Int. Cl.
*H04W 24/00* (2009.01)
*H04W 4/02* (2018.01)
*H04L 29/08* (2006.01)
*H04W 4/021* (2018.01)

(52) U.S. Cl.
CPC ............ *H04W 4/023* (2013.01); *H04L 67/18* (2013.01); *H04L 67/306* (2013.01); *H04W 4/021* (2013.01)

(58) Field of Classification Search
None
See application file for complete search history.

(56) References Cited

U.S. PATENT DOCUMENTS

2014/0372290 A1* 12/2014 Khaef ............... H04L 65/403
705/39
2017/0134919 A1* 5/2017 Nordstrom ............ H04W 4/206

* cited by examiner

*Primary Examiner* — Erika Washington
(74) *Attorney, Agent, or Firm* — Kwan & Olynick LLP (57) ABSTRACT

Certain embodiments of the present disclosure provide methods and systems for facilitating mobile device connections using geo data items. The method comprises receiving data packets transmitted over a network from a first mobile device corresponding to a first user. The data packets include a request for a dining companion, user information corresponding to the first user, and geo data items identifying a geo-location associated with the first user. A point-of-interest is determined based on the geo data items. One or more other mobile devices, corresponding to system users, within a bounded geographical area of the point-of-interest, are located based on the request and corresponding geo data items. An aggregated score for each system user is calculated based on user attributes and a connection between the first user and a system user is facilitated by the system if the aggregated score corresponding to the system user meets a predetermined threshold.

20 Claims, 8 Drawing Sheets

SYSTEM AND METHOD FOR FACILITATING SOCIAL DINING EXPERIENCES USING LOCATION INFORMATION

TECHNICAL FIELD

The present disclosure relates generally to mobile location services, and more specifically to facilitating dining engagements based on location.

BACKGROUND

According to the ancient Greek philosopher, Epicurus, "[w]e should look for someone to eat and drink with before looking for something to eat and drink, for dining alone is leading the life of a lion or wolf." For many individuals, there is a social stigma or discomfort to dining alone in public, so sitting at a table for one can give them a sense of anxiety or shame. For other people, meals are communal activities and the idea of eating alone in an intimate environment, like a restaurant, leaves them feeling exposed and self-conscious. Other individuals may see sharing a meal as a great way to meet new people and network. For these, and other various reasons, many individuals desire to engage in activities, such as dining, with another individual and/or individuals. Thus, there is a need for an improved method and system for facilitating dining engagements.

SUMMARY

The following presents a simplified summary of the disclosure in order to provide a basic understanding of certain embodiments of the present disclosure. Provided are examples of mechanisms and processes relating to facilitating mobile device connections using geo data items.

In one aspect, which may include at least a portion of the subject matter of any of the preceding and/or following examples and aspects, a method comprises receiving, at a server system, one or more data packets transmitted over a network from a first mobile device corresponding to a first user. The one or more data packets include a request for a dining companion from one or more system users. The one or more system users includes a second user. The one or more data packets also include user information corresponding to the first user. In some embodiments, the user information includes one or more of the following data items: a historical POI, temporal data, motion pattern data, wireless device information, temperature information, phone usage information, and one or more user preferences. The one or more data packets also include one or more geo data items identifying a geo-location associated with the first user. Each geo data item identifies a geo-location based on at least one geo-coordinate.

The method further comprises determining, by a processor of the server system, a point-of-interest (POI) based on the one or more geo data items identifying the geo-location associated with the first user. In various embodiments, the POI is a restaurant. In some embodiments, determining the POI includes retrieving one or more POIs from a database based on the one or more geo data items identifying the geo-location associated with the first user. In some embodiments, the one or more geo data items identifying the geo-location associated with the first user are selected by the first user. The one or more POIs may be located within a bounded geographical area corresponding to the identified geo-location associated with the first user. Determining the POI may further include calculating an aggregated score for each POI of the one or more POIs by assigning weighted scores to one or more POI attributes corresponding to the one or more POIs based on the user information. In some embodiments, the POI attributes include one or more of the following: a user rating, a cuisine type, a price range, an ambiance, operating hours, parking availability, a noise level, required attire, and accepted payment. Determining the POI may further include prompting the first user for a selection of a scored POI.

The method further comprises locating, by the processor, one or more other mobile devices within a bounded geographical area of the POI. The one or more other mobile devices correspond to one or more system users including a second mobile device corresponding to the second user. In some embodiments, the one or more other mobile devices are located based on the request for a dining companion and one or geo data items corresponding to the one or more other mobile devices. In some embodiments, the bounded geographical area is defined by a predetermined radius from the POI.

The method further comprises calculating, by the processor, an aggregated score for each system user based on a plurality of user attributes corresponding to the one or more system users. The one or more user attributes are assigned weighted scores based on the user information. In some embodiments, the user attributes include one or more of the following: a gender, an age, a political view, a personality trait, a preferred cuisine type, a food allergy, a preferred travel range, a preferred price range, and a food consumption level.

The method further comprises facilitating, by the server system, a connection between the first user and the second user if the aggregated score corresponding to the second user meets a predetermined threshold. In some embodiments, facilitating a connection between the first user and the second user includes receiving, at the server system, a message from the first mobile device. The message may be transmitted over the network via a communication protocol and includes a destination address corresponding to the second mobile device. Facilitating the connection may further include delivering the message to the second mobile device over the network. In some embodiments, the server system temporarily stores the message, if the second user is unavailable, for delivery to the second mobile device once the second user becomes available.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features.

In another aspect, which may include at least a portion of the subject matter of any of the preceding and/or following examples and aspects, a system is provided that comprises a server including a processor and memory. The server is configured to receive one or more data packets transmitted over a network from a first mobile device corresponding to a first user. In various aspects, the one or more data packets include a request for a dining companion from one or more system users. The one or more system users includes a second user. The one or more data packets further include user information corresponding to the first user and one or"

more geo data items identifying a geo-location associated with the first user. Each geo data item identifies a geo-location based on at least one geo-coordinate. The server is further configured to determine a point-of-interest (POI) based on the one or more geo data items identifying the geo-location associated with the first user. In some embodiments, the POI is a restaurant. A second mobile device, corresponding to the second user, within a bounded geographical area of the POI may be located by the processor based on the request for a dining companion and one or more geo data items corresponding to the second mobile device.

In some embodiments of the system, an aggregated score for the second user is calculated by the processor based on a plurality of user attributes corresponding to the second user. The one or more user attributes may be assigned weights based on the user information. In further embodiments of the system, a connection between the first user and the second user is facilitated by the server if the aggregated score corresponding to the second user meets a predetermined threshold.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular activities, such as dining. However, it should be noted that the techniques of the present disclosure apply to various other types of activities and social engagements. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

In one or more embodiments, the term "geo-coordinates" refers to a pair of numerical values indicating latitude and longitude of a physical location or area. In addition, the term "geo data item" may be used to refer to an instance of geo-coordinates found in Internet traffic. Further, the term "geo-location" refers to data containing one or more geo data items. As further used herein, a "point of interest", or POI, is a specific location that someone may find useful or interesting. While a POI may refer to any location that offers specific activity (e.g., ballpark) or business type (e.g., a restaurant or car repair), the term may also refer to hotels, campsites, fuel stations or any other categories used in modern (automotive) navigation systems. In one or more embodiments, a POI specifies, at minimum, the latitude and longitude of the location based on a certain map datum. A name or description is usually attached to a POI.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a method, and corresponding systems, for facilitating mobile device connections using geo data items is provided. In various implementations, the method may be used for facilitating connections between users of a network searching for a dining companion to meet for a meal. The method comprises receiving data from a first mobile device corresponding to a first user. In various embodiments, the data from the first mobile device includes a request for a dining companion, along with user information and geo-location information corresponding to the first user.

Upon receiving the information, the system determines a point-of-interest (POI) based on the geo-location information. In some embodiments, the POI is determined by receiving a selected POI and/or geo-location of a POI from the first mobile device. Such selected POI and/or geo-location may be a remote POI and/or location some distance away from the first user. In other embodiments, the POI may additionally, and/or alternatively, be determined by retrieving one or more POIs from a database based on a selected geo-location and/or the geo-location of the first mobile device. The system may then score and rank the one or more POIs based on the user information corresponding to the first user. The first user may then select a POI from the one or more scored POIs.

Once a POI has been determined, the system locates one or more other mobile devices, corresponding to other users of the system, that are located within a particular geographical area of the determined POI. The other users, corresponding to the other mobile devices, are then scored and ranked based on a plurality of user attributes associated with the other users. A ranked list of other users with a score above a predetermined threshold may then be presented to the first user at the first mobile device, at which point the first user may select one or more other users to message and arrange a meeting.

Example Embodiments

Figure 1A:
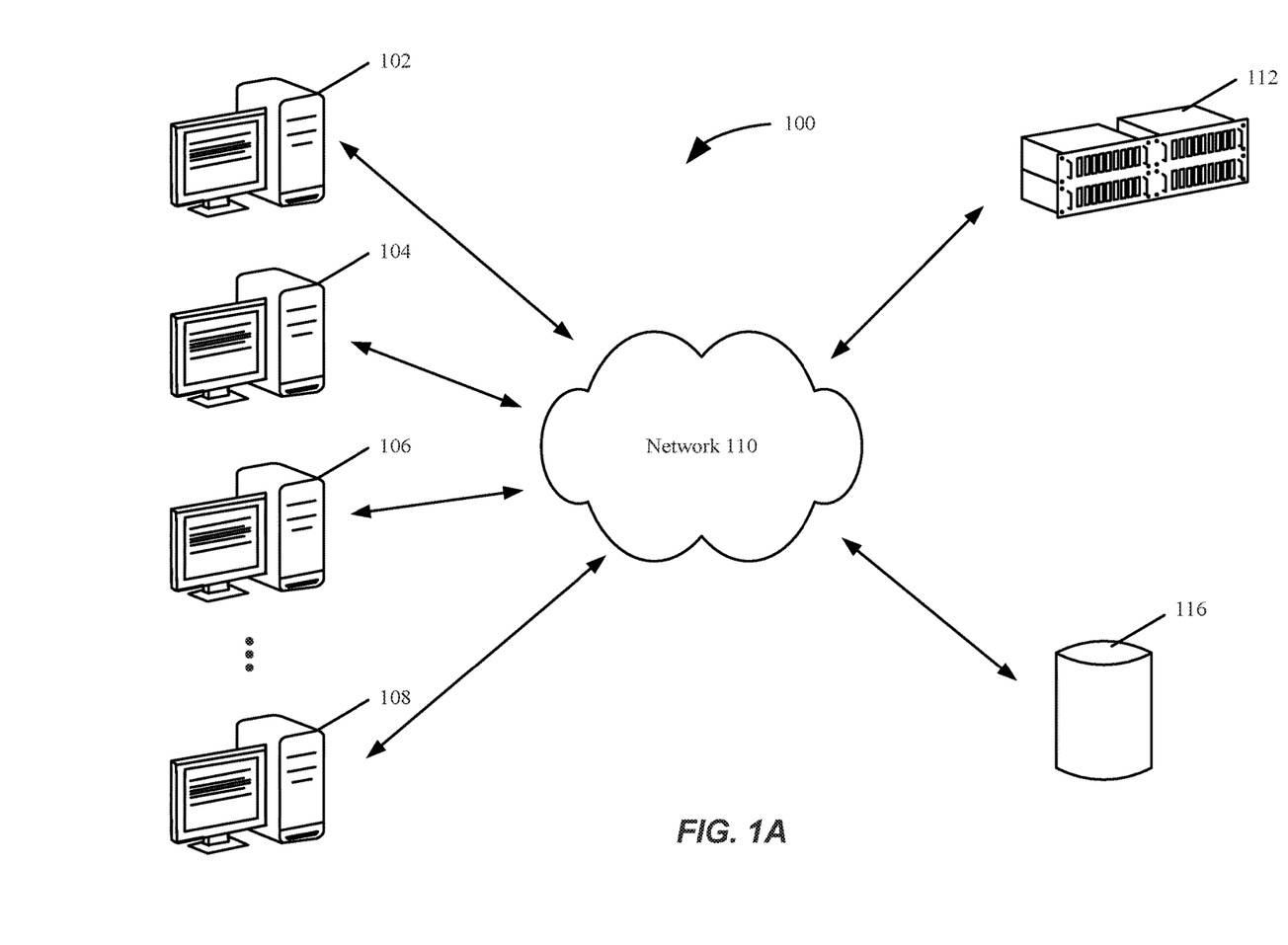
FIG. 1A illustrates a diagram of an example network architecture for implementing various systems and methods of the present disclosure, in accordance with one or more embodiments.

FIG. 1A illustrates a diagram of an example network architecture 100 for implementing various systems and methods of the present disclosure, in accordance with one or more embodiments. The network architecture 100 includes a number of client devices 102-108 communicably connected to server system 112 by a network 110. In some embodiments, server system 112 includes one or more processors and memory. The processors of server system 112 execute computer instructions (e.g., network computer program code) stored in the memory to perform functions of a network data exchange server.

In some embodiments, server system 112 is a content server configured to receive and store network profile information. Server system 112 may also function as a dispatch server configured to transmit and/or route network data packets including network messages. In some embodiments, the network architecture 100 may further include a database 116 communicably connected to client devices 102-108 and server system 112 via network 110. In some embodiments, network data, or other information such as network profile information, user information, and/or POI information, may be stored in and/or retrieved from database 116. In some embodiments, database 116 is a component within server system 112 and stored within memory of server system 112.

Users of the client devices 102-108 may access the server system 112 to participate in a network data exchange service, such as a network messaging service. For example, the client devices 102-108 can execute web browser applications that can be used to access the network data exchange service. In another example, the client devices 102-108 can execute software applications that are specific to the network (e.g., networking data exchange "apps" running on smartphones). In further embodiments, client devices 102-108 are configured to use global position system (GPS), or other geo-location capabilities, to determine a user's location.

Users interacting with the client devices 102-110 can participate in the network data exchange service provided by the server system 112 by distributing digital content, such as text comments (e.g., updates, announcements, replies), digital photos, videos, or other appropriate electronic information. In some implementations, information can be posted on a user's behalf by systems and/or services external to the network or the server system 112. For example, the user may post a review of a restaurant to a restaurant review website, and with proper permissions, that website may cross-post the review to the network on the user's behalf. In another example, a software application executed on a mobile device, with proper permissions, may use global positioning system (GPS) capabilities to determine the user's location and automatically update the network with their location (e.g., "At Home", "At Work", "In San Francisco, Calif.").

In some implementations, the client devices 102-110 can be computing devices such as laptop or desktop computers, smartphones, personal digital assistants, portable media players, tablet computers, or other appropriate computing devices that can be used to communicate with an electronic social network. In some implementations, the server system 112 can include one or more computing devices such as a computer server. In some implementations, the server system 112 can represent more than one computing device working together to perform the actions of a server computer (e.g., cloud computing). In some implementations, the network 110 can be a public communication network (e.g., the Internet, cellular data network, dial up modems over a telephone network) or a private communications network (e.g., private LAN, leased lines).

Figure 1B:
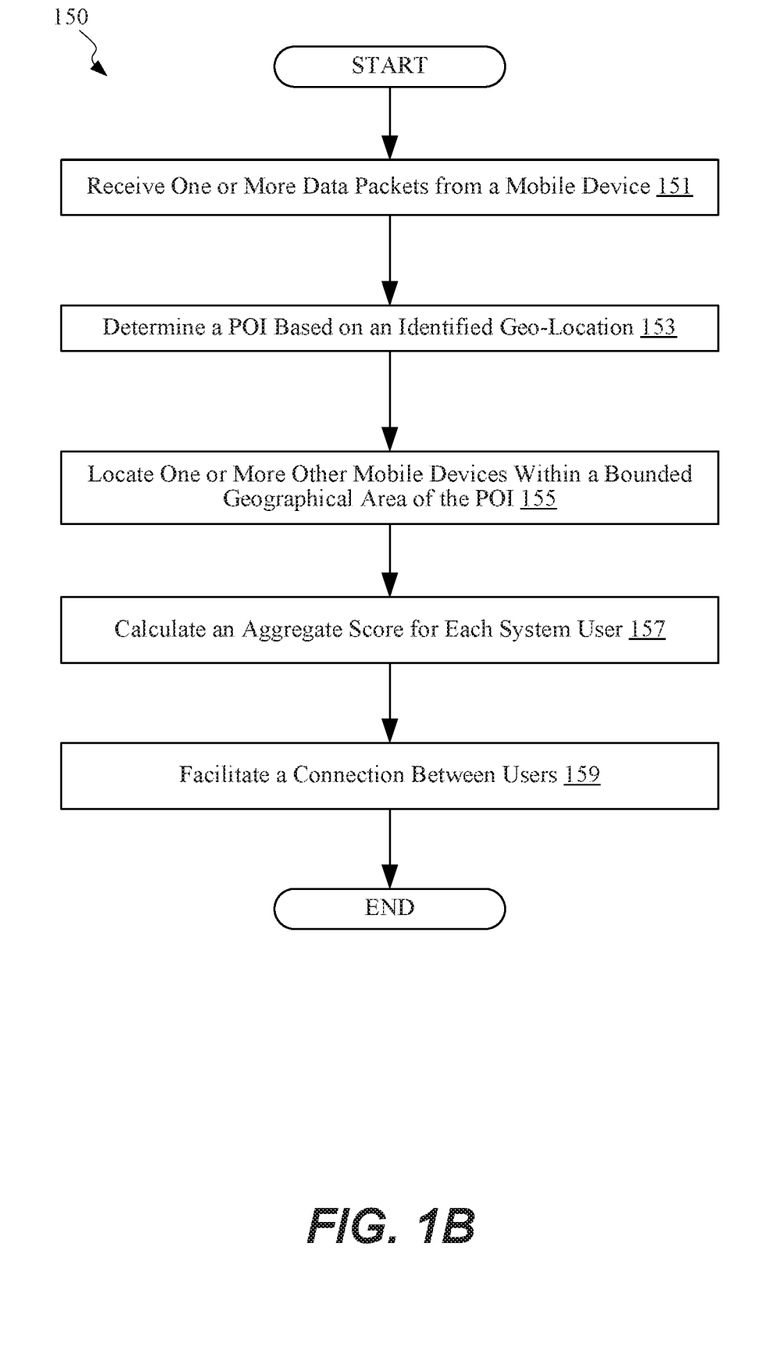
FIG. 1B illustrates a process flowchart corresponding to a method for facilitating mobile device connections using geo data items, in accordance with one or more embodiments.

FIG. 1B illustrates a process flowchart corresponding to a method 150 for facilitating mobile device connections using geo data items, in accordance with one or more embodiments. Method 150 may be implemented by system 100. At step 151, one or more data packets are received from a mobile device, such as any of client devices 102-108. In some embodiments, the mobile device is a first mobile device corresponding to a first user, which may transmit data packets over network 110. Alternatively, and/or additionally, the mobile device may be a second mobile device corresponding to a second user. For the purposes of this disclosure, the terms "first" and "second" may be used to describe particular elements within disclosed systems and methods. However, such terms are used merely for identification and descriptive purposes and are not meant to specifically fix or limit any element to any particular function. For example, operations and/or actions implemented by a first mobile device may be implemented by other mobile devices, such as client devices 102-108, corresponding to other system users.

The data packets may include a request for a dining companion from one or more system users, which are connected to network 100 via mobile devices, such as client devices 102-108. The data packets may further include user information corresponding to the user of the mobile device, and/or one or more geo data items identifying a geo-location associated with the user of the mobile device. For example, data packets, which are transmitted by a first mobile device corresponding to a first user, may include user information corresponding to the first user, as well as geo data items identifying a geo-location associated with the first user. Transmission and reception of data packets is further described below with reference to operation 201.

At step 153, a POI is determined based on an identified geo-location. For example, the identified geo-location may be the geo-location associated with the first user identified by geo data items transmitted by the first mobile device. In some embodiments, one or more POIs are stored on a database, such as database 116. Database 116 may be a local database or a global database accessed through a global network, such as network 110. In some embodiments, other information corresponding to the POIs is also stored in database 116. For example, database 116 may store a network profile for one or more POIs that are restaurants, with each network profile including corresponding information including, but not limited to, the restaurant name, address, cuisine type, and price range.

In some embodiments, one or more stored POIs may be retrieved from the database based on the identified geo-location of the first mobile device. For example, a predetermined number of restaurants that are located within a bounded geographical area of the identified location of the first mobile device may be retrieved. Alternatively, and/or additionally, one or more POIs may be retrieved from the database based on a geo-location selected by the first user, which may be some distance away from the first mobile device. For example, the first user may select a geo-location on a map and a predetermined number of restaurants located within a bounded geographical area of the selected geo-location may be retrieved from the database. The first user may then select a POI from the one or more retrieved POIs. Alternatively, and/or additionally, a POI may be automatically determined from the retrieved POIs. In some embodiments, the retrieved POIs may be ranked based on user information corresponding to the first user, which may include user preferences of the first user. In yet another embodiment, the first user may select a desired POI and corresponding geo-location information and/or network profile information may be retrieved from a database. Determination of POIs is further described below with reference to operation 203.

At step 155, one or more other mobile devices within a bounded geographical area of the POI are located. The other mobile devices may correspond to one or more system users, including the second mobile device corresponding to the second user. In instances where the data packets were transmitted by the second mobile device at step 151, the other mobile devices located at step 155 may include the first mobile device. The other mobile devices may be located based on geo data items transmitted from each mobile device that identify a geo-location associated with the system user of the respective mobile device. For example, the geo data items transmitted by a mobile device may identify the present geo-location of that mobile device. As another example, the geo data items transmitted by a mobile device may identify a geo-location selected by the system user corresponding to that mobile device. One or more mobile devices may transmit geo data items identifying geo-locations within a bounded geographical area of the POI determined at step 153. In some embodiments, a bounded geographical area may be defined by a predetermined radius around the POI. Additionally, and/or alternatively, the bounded geographical area may comprise a predetermined rectangular grid surrounding the POI. In further embodiments, a bounded geographical area may comprise any other desired shape and/or size surrounding and/or near the POI. Locating other mobile devices is further described below with reference to operation 205.

At step 157, an aggregate score for each system user is calculated. Each system user corresponding to a mobile device located at step 155 may be scored based on comparing the user information received at step 151 with other information corresponding to the system user of a located mobile device, such as user attributes include gender, age, personality traits, preferred food types, etc. Various matching algorithms may be implemented to calculated an aggregate score for each system user. Calculating aggregate scores for system users is further described below with reference to operation 207.

At step 159, a connection between users is facilitated. In some embodiments, one or more system users may be ranked based on the aggregate scores calculated at step 157. In some embodiments, a list of scored system users with an aggregate score above a predetermined threshold may be generated. In some embodiments, the list of scored system users may be ranked, such as by calculated aggregate score, alphabetic order, distance from determined POI, distance from the first user, etc. A user, such as the first user, may be presented with the list of the ranked system users, and the first user may select one or more of the ranked system users to message. In some embodiments, the system may automatically message the highest ranked system user. The automatic message may include a notification of the match and the first user's request for a dining companion. Once a connection is established, the connected users may arrange to meet at the identified POI to dine. Facilitating connections between users is further described below with reference to operation 209.

Figure 2A:
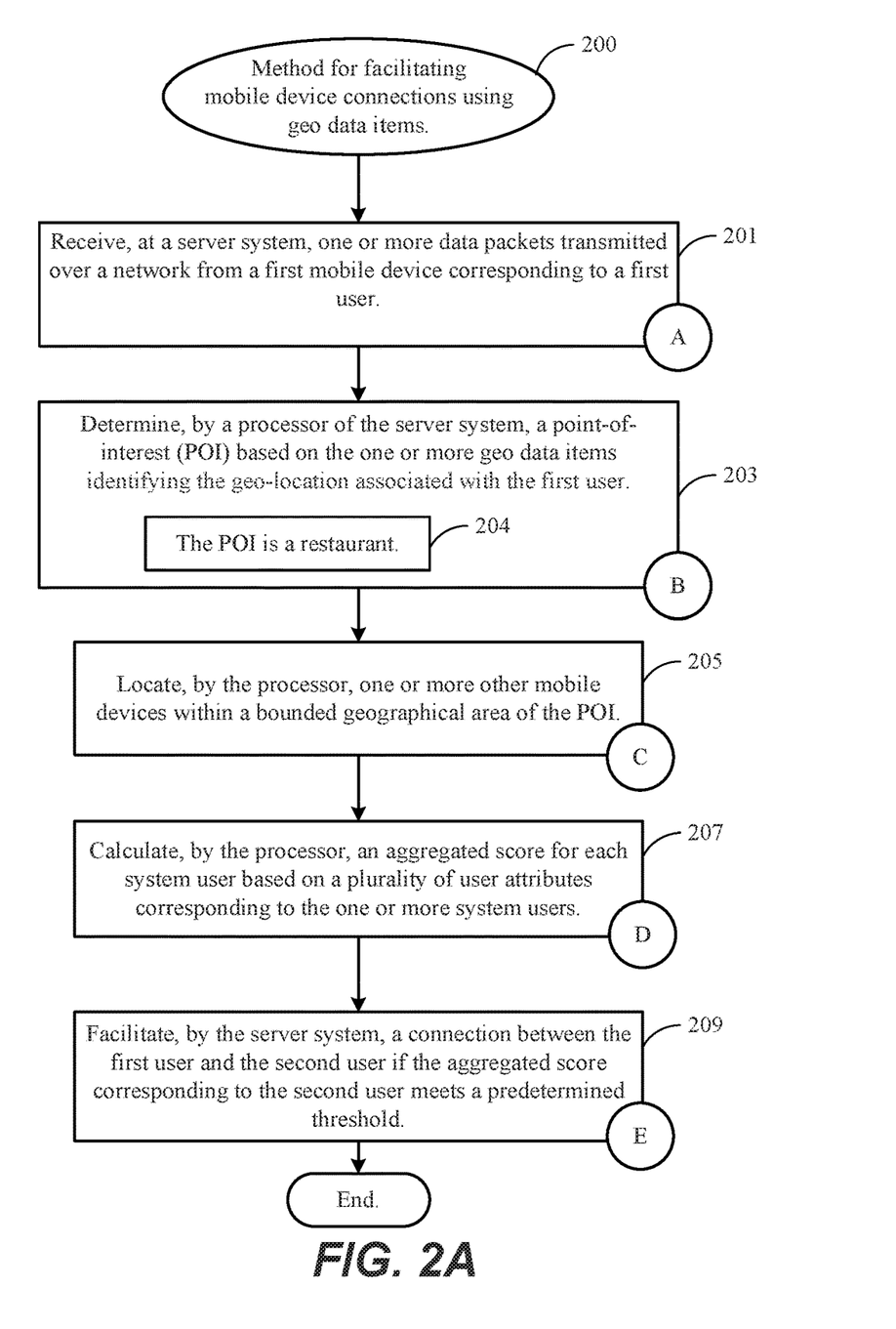
FIGS. 2A-2D illustrate another example method for facilitating mobile device connections using geo data items, in accordance with one or more embodiments.

FIGS. 2A-2D illustrate another example method 200 for facilitating mobile device connections using geo data items, in accordance with one or more embodiments. With reference to FIG. 2A, one or more data packets are received at a server system, such as server 112, at operation 201. In some embodiments, operation 201 may be step 151 previously described in FIG. 1B. The one or more data packets may be transmitted over a network from a first mobile device corresponding to a first user. In some embodiments, the first mobile device is a client device 102-108 transmitting the data packets over a network, such as network 110. The data packets may include various network messages and/or data. For example, the one or more data packets may include a request 211 for a dining companion from one or more system users 212. The one or more system users 212 includes a second user. In particular, a first user desiring to meet one or more other individuals for a meal may initiate a request for a dining companion utilizing a software application on the first mobile device. According to various embodiments, the second user is another user of the system with a corresponding mobile device 102-108 connected through network 110.

In some embodiments, the one or more data packets also include one or more geo data items 217 identifying a geo-location 219 associated with the first user. Each geo data item of the one or more geo data items 217 identifies a geo-location 219 based on at least one geo-coordinate. As previously explained, geo-location 219 data comprises one or more geo data items 217, while a geo data item 217 identifies a geolocation 219 based on at least one geo-coordinate referring to a numerical value indicating latitude and/or longitude of a physical location or area. In some embodiments, other geo data items 217 may correspond to altitude. Such spatial information (e.g., longitude, latitude, altitude) of a user can be determined by a global positioning system (GPS) of the corresponding mobile device. In other embodiments, other positioning systems may be used to determine the geo data items 217 identifying a geo-location 219 of the first mobile device, such as a Wi-Fi positioning system.

In some embodiments, the one or more data packets also include user information 213 corresponding to the first user. The user information may include one or more of the following data items 215: a historical POI, temporal data, motion pattern data, wireless device information, temperature information, phone usage information, and one or more user preferences. Such data items 215 may be data collected from various sources, including various mobile device components and/or sensors, various mobile device applications, email servers, local databases, and other global databases and/or servers accessed over a network, such as network 114. In some embodiments, user information 213 is input by the first user and stored in a database, such as database 116. User information 213 may additionally, and/or alternatively, be determined by another application of the first mobile device.

In some embodiments, historical information corresponding to the first user is tracked over time for future processing. Such historical information may include historical POIs such as locations that the first user has recently visited and/or bookmarked. In some embodiments, historical POI information includes a list of locations visited and/or bookmarked by the first user within a predetermined range of time from the current date. In some embodiments, the type of restaurants preferred by the user can be determined based on historical information about the user. Such preferences may be used in determining a preferred POI, as further described in operations 203 and 221. In addition, the mobile patterns, such as what type of businesses the user prefers to visit on a certain day (e.g. weekdays or weekends) of the week, may also be used to determine a preferred POI. For example, identifying that a user visited several cafes may indicate a user preference for POIs corresponding to beverages, coffee, coffee house, etc.

In some embodiments, historical POIs may also be determined by another application on the first mobile device, such as a search history of a web browser, travel applications, restaurant database networks, etc. As another example, the first user may utilize an application to store and organize favorite restaurants and/or potential restaurants to visit in a particular city or location. In other embodiments, the other data items 215 of user information 213, described below, may provide additional information regarding historical and/or current locations of interest to a user, such as the first user, of a mobile device, such as the first mobile device.

In some embodiments, temporal data includes the current time in one or more time zones. Temporal data may further include timing associated with the spatial information (e.g., longitude, latitude, altitude) determined by the mobile device. The timing can include, for example, a time of day, a day of week, a holiday, and/or a month of a year. Alternatively or additionally, the timing can include information accessed, for example, from calendar of mobile device. The timing can additionally and/or alternatively include durations of time spent at a location. In other embodiments, temporal data further includes schedule data from a user calendar or other date keeping application on the first mobile device and may include data corresponding to appointments, reminders, and other events of the first user.

In some embodiments, motion pattern data includes acceleration information determined by an accelerometer of the mobile device. In another embodiment, motion pattern data includes rotation information determined by a gyroscope of the mobile device. In another embodiment, motion pattern data includes direction information determined by a compass of the mobile device. In such embodiments, acceleration information, rotation information, and direction information may be tracked to determine present and/or historical motion patterns of the user to aid in identifying the at least one POI. The acceleration information and rotation information can track the walking, running, sitting, and/or driving activity of the user. These activities that can be deduced based on sensed acceleration information can be used to refine determinations of points of interest. For example, the GPS may be precise enough to narrow down the identification of a location of the user to three businesses. The signals generated by the motion sensor can provide an indication of the activity of the user, which can be used to additionally identify the location of the user. For example, when a department store is located next to a café, the user's motion pattern can be used to disambiguate between the two POIs, the department store or the café. If the user's motion pattern indicates that the user has been walking for a majority of the time, then it is more likely that the user visited the department store. On the other hand, if the user's motion pattern indicates that the user has been sitting still for long periods of time, then it may be more likely that the user visited the cafe is higher.

In some embodiments, wireless device information includes connectivity information, such as WiFi access points, WiFi SSID, Bluetooth MAC address, Bluetooth ID, etc. The wireless device information can be used to aid in the determination of POIs. For example, the mobile device may be connected to the wireless internet service at a café and such wireless device information can be used to identify the present and/or historical location as the café.

In some embodiments, temperature information includes an ambient temperature of the user determined by, for example, a thermometer of the mobile device. The thermometer can provide present or historical ambient temperatures of the user. The temperature of the user can be used to aid in the determination of POIs. For example, temperature can be used to determine whether the user is or was outside versus inside.

In some embodiments, phone usage information includes information relating to voice calls made by the first user. In various embodiments, such information can be used to aid in the determination of POIs. For example, if making a voice call, the user is less likely to be, for example, at a movie, a restaurant, or a work related meeting. In other embodiments, phone usage information also includes determining whether the mobile device is charging. For example, if the device is charging, it may be likely that the user is at home, at the office or driving a car.

User preferences corresponding to the first user may include various preferred attributes corresponding to POIs and/or other users. For example, a first user may input preferences for POI attributes 226, such as a user rating, a cuisine type, a price range, an ambiance, operating hours, parking availability, a noise level, required attire, and accepted payment. Furthermore, the first user may input preferences for user attributes 241 corresponding to other users of the system, such as a gender, an age, a political view, and a personality trait. POI attributes 226 and user attributes 241 are further described below. In further embodiments, user information 213 may additionally, and/or alternatively, include other data, such as images, audio signals, light levels, barometric information, biometric information, etc.

Figure 2B:
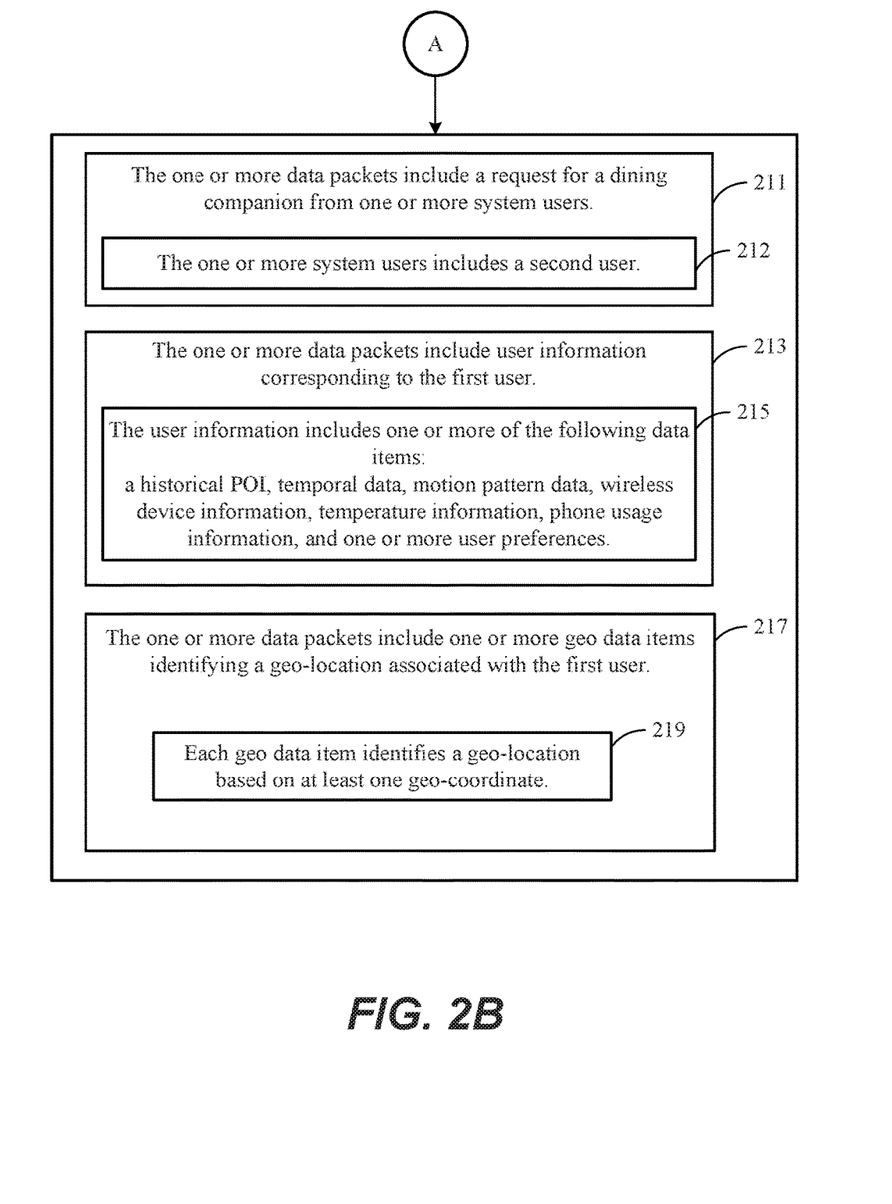

At operation 203, a point-of-interest (POI) 204 is determined by a processor of the server system based on the one or more geo data items 217 identifying the geo-location 219 associated with the first user. In some embodiments, operation 203 may be step 153 previously described in FIG. 1B. In some embodiments, the POI 204 is a restaurant. In other embodiments, the POI 204 may be any other type of dining venue, such as a hotel, a café, a bar, a diner, a club, etc. In further embodiments, the POI may be any specific point location that someone may find useful or interesting.

In various embodiments, a POI 204 is determined by retrieving one or more POIs from a database at operation 221. In some embodiments, the database is database 116, described in FIG. 1A. The database may be a local database and/or global database accessed through a global network, such as network 110. In some embodiments, the database is part of a network data exchange service. The one or more POIs may be retrieved based on the one or more geo data items 217 identifying the geo-location 219 associated with the first user. The geo-location 219 associated with the first user may be the current location of the first mobile device or a remote location selected by the first user.

In some embodiments, the geo-location 219 associated with the first user may be the current location of the first mobile device. For example, the geo-location 219 associated with the first user may be the current location of the first mobile device determined by GPS or other positioning system. Alternatively, and/or additionally, the one or more geo data items 217 identifying the geo-location 219 associated with the first user are selected (223) by the first user. For example, the first user may specifically select a set of geo-coordinates associated with a desired restaurant. The desired restaurant corresponding to the selected set of geo-coordinates may then be retrieved from a database as the POI 204. As yet another example, the first user may select a specific restaurant or other dining venue, and the geo-coordinates corresponding to the specific restaurant may be retrieved from a database or other application. In some embodiments, the selected geo-location 219 may be located some distance away from the first user to be used to determine a remote POI 204. For example, the first user may select a restaurant with a corresponding geo-location 219 that is several miles away from the location of the first user. As another example, the first user may select particular geo-coordinates corresponding to a location (e.g., a neighborhood, campus, street, etc.) on a map application on the first mobile device. Such remote POI 204 may be selected where the first user is planning to be at that location at a later time.

In some embodiments, the one or more POIs retrieved from the database may be located within a bounded geographical area 224 corresponding to the identified geo-location 219 associated with the first user. In some embodiments, the bounded geographical area 224 is defined by a rectangular area with a given length 1 and a given width w may be centered around the geo-location 219 associated with the first user. The rectangular area may be divided into a grid of smaller rectangular units, including a unit containing the geo-coordinates of the geo-location 219 associated with the first user. The bounded geographical area 224 may comprise a predetermined number of smaller rectangular units around the unit containing the geo-coordinates of the geo-location 219. In other embodiments, the bounded geographical area 224 is defined by a predetermined radius from the geo-location 219 associated with the first user. In various embodiments, other shapes and/or methods may be used to define the bounded geographical area 224 in which the one or more retrieved POIs are located. The POIs may be retrieved from a database, such as database 116, located in or separate from the server system, where the POIs may be stored with associated geo-coordinates and other corresponding data, such as POI attributes 226. One or more of the various methods for retrieving POIs described above may be optional in some embodiments, or implemented concurrently and/or alternatively in other embodiments.

Once the one or more POIs have been retrieved, an aggregated score for each POI of the one or more POIs may be calculated at operation 225 by assigning weighted scores to one or more POI attributes 226 corresponding to the one or more POIs based on user information 213. In some embodiments, the POI attributes 226 include one or more of the following: a user rating, a cuisine type, a price range, an ambiance, operating hours, parking availability, a noise level, required attire, and accepted payment. POI attributes 226 may additionally, and/or alternatively include other relevant characteristics and/or services of a dining venue, such as delivery availability, reservation acceptance, outdoor seating, allowance of dogs, wi-fi availability, wheelchair accessibility, etc. In other embodiments, POI attributes 226 may include various other data corresponding to a particular restaurant or other dining venue.

In some embodiments, each POI attribute 226 is given a score based on user information 213, including a historical POI, temporal data, motion pattern data, wireless device information, temperature information, phone call information, and one or more user preferences. As previously described such user information 213 may aid in the determination of a POI 204. For example, a POI history may indicate that restaurants serving hamburgers were most visited by the first user in the past week. This user information 213 may be used to assign a higher score to restaurants within the one or more POIs with POI attributes 226 corresponding to a cuisine type of hamburgers. As another example, temperature information may indicate that the measured temperature at the geo-location 219 is 85° F. This user information 213 may be used to assign a higher score to restaurants with POI attributes 226 corresponding to cuisine types including dishes enjoyed during hot weather, such as salads, ice cream, and/or other beverages. As yet another example, user information 213 may include a user preference of a price range of $30-$50 per person. This user information 213 may be used to assign a higher score to restaurants with POI attributes 226 corresponding to that price range. In some embodiments, user information 213 can be used to filter the one or more POIs and eliminate them from receiving any score. For example, if user information 213 indicates that the first user is lactose intolerant, then identified ice cream shops may be precluded from receiving any score and/or be eliminated from possible selection. An aggregated score is calculated for each POI for all the scored POI attributes 226. For example, one (1) point may be assigned to each POI attribute 226 that matches with a preference in user information 213 and one (1) point may be discounted for each POI attribute 226 that conflicts with a preference in user information 213. In other embodiments other scoring methods and/or criteria can be implemented to rank the retrieved POIs. Scoring the one or more POIs at operation 225 may be optional and may not be implemented in some embodiments.

In some embodiments, the first user is prompted for a selection of a scored POI 204 at operation 227. In some embodiments, the first user is provided a ranked list of the scored POIs. In embodiments, where operation 225 is not implemented, the first user may be provided a list of retrieved POIs ordered randomly or based on other attributes (e.g., alphabetical order, distance from the identified geo-location, rankings by other users, etc.). The first user may then select a determined POI 204 from the scored POIs. Each POI stored in the database may include a corresponding network profile accessible by the first user. In some embodiments, a network profile corresponding to a POI may include the POI attributes 226 and/or images of the venue and/or dishes served. In some embodiments, a POI 204 may be automatically selected. For example, the system may automatically select the POI with the highest score calculated at operation 227.

Figure 2C:
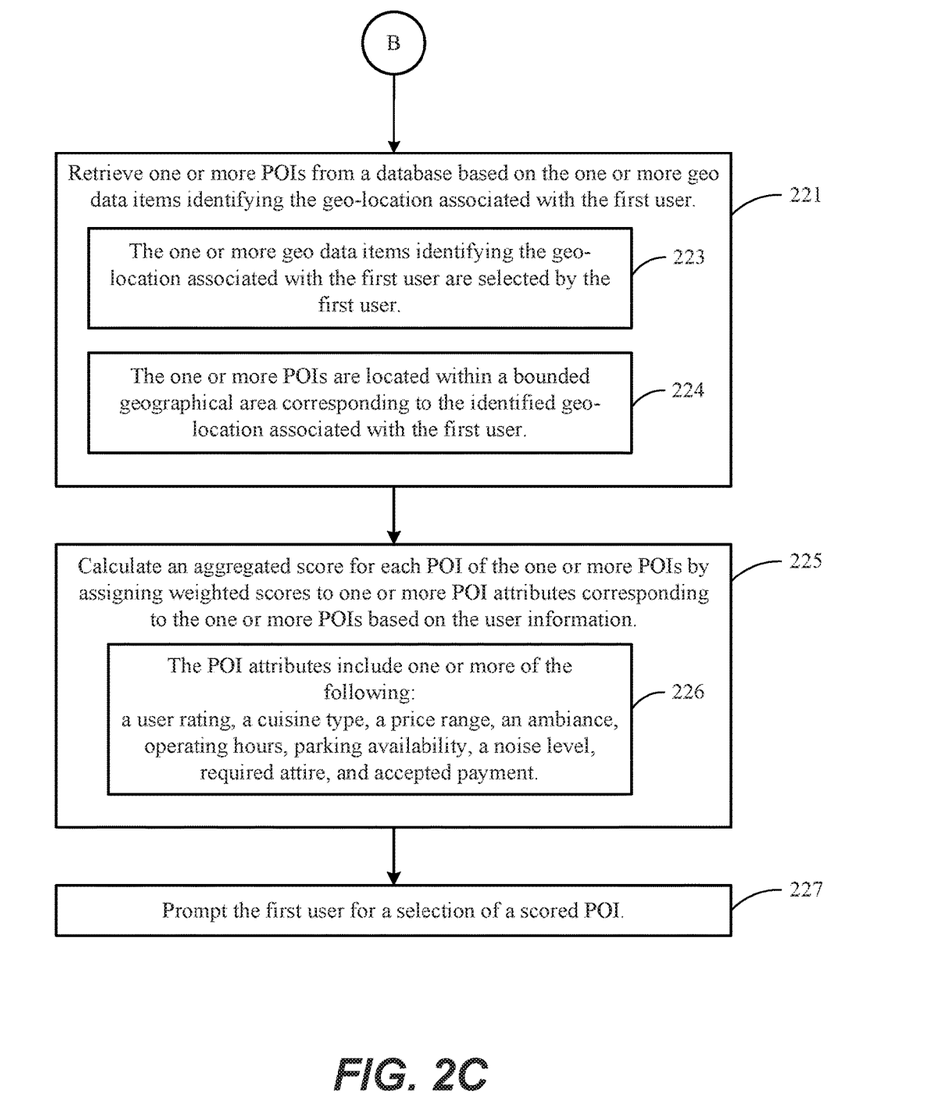

Once the POI 204 has been determined at operation 203, one or more other mobile devices 231 within a bounded geographical area 237 of the POI 204 are located by the processor, at operation 205. In some embodiments, operation 205 may be step 155 previously described in FIG. 1B. In some embodiments, the one or more other mobile devices are client devices 102-108. The one or more other mobile devices 231 correspond to the one or more system users 212, including a second mobile device corresponding to the second user. The one or more other mobile devices 231 are located based on the request 211 for a dining companion and one or more geo data items 235 corresponding to the one or more other mobile devices 231. In some embodiments, the other system users 212, including the second user, may also transmit data packets over network 110 via corresponding mobile devices 231, including the second mobile device. Like the data packets transmitted by the first mobile device, the data packets transmitted by the other system users 212 may also include a request for a dining companion (such as request 211), user information corresponding to the other system users 212, and/or geo data items 235. Like geo data items 217 transmitted from the first mobile device, geo data items 235 may include spatial information (e.g., longitude, latitude, altitude) corresponding to the one or more other mobile devices 231 may also be determined by GPS or other positioning system. In some embodiments, the bounded geographical area 237 is defined by a predetermined radius from the POI. In other embodiments, the bounded geographical area may comprise a predetermined number of rectangular grid units surrounding the POI, as previously described for bounded geographical area 224. In some embodiments, bounded geo-graphical area 237 may overlap and/or coincide with bounded geographical area 224.

At operation 207, an aggregated score for each system user 212 is calculated by the processor based on a plurality of user attributes 241 corresponding to the one or more system users 212. In some embodiments, operation 207 may be step 157 previously described in FIG. 1B. Such user attributes 241 may be included in the user information within the one or more data packets transmitted by the other mobile devices 231. In some embodiments, the user attributes 241 include one or more of the following: a gender, an age, a political view, a personality trait, a preferred cuisine type, a food allergy, a preferred travel range, a preferred price range, and a food consumption level. For example, the user attributes 241 of the second user may include a gender of male, an age of 30, a political view of liberal, and confident, talkative, and organized as personality traits. Furthermore, the user attributes 241 of the second user may include preferred cuisine of American, Indian, and Italian, no food allergies, a maximum travel range of 10 miles, a preferred price range of $20-$30, and a moderate food consumption level. In other embodiments, user attributes 241 may include various other data corresponding to a system user 212. In some embodiments, a network profile corresponding to each system user 212, including the second user, is stored in a database, such as database 116. Each network profile may include photo of the system user 212 and information corresponding to the system user 212, such as user attributes 241. In some embodiments, the network profiles may be validated by other system users 212.

In some embodiments, the one or more user attributes 241 are assigned (243) weighted scores based on the user information 213. As previously described, user information 213 may include user preferences corresponding to the first user, which may include various preferred attributes corresponding other users, such as a preferred gender, age, political view, and/or personality traits. For example, the first user may be a male and prefer only to meet with other males for meals. In some embodiments, one (1) point may be assigned to each user attribute 241 that matches a preferred attributes corresponding to the first user. In some embodiments, all system users 212 located at operation 207 that are female are eliminated. In further embodiments, preferences of the system users 212 may also be used in filtering. In the previous example, all system users 212 located at operation 207 that are male, but do not prefer to match with other males may also be eliminated.

In some embodiments, the one or more user attributes 241 may be additionally, and/or alternatively assigned (243) weighted scores based on the POI attributes 226 of the determined POI 204. For example, if the selected POI 204 includes a POI attribute 226 corresponding to a cuisine type, such as Japanese-sushi, does not match a preferred cuisine type within the user attributes 241 of the second user, a lower score may be given to that user attribute 241 for the second user. As another example, if the selected POI 204 includes a POI attribute 226 corresponding to a price range, such as $15-$25, matches the preferred price range of the second user, a higher score may be given to that user attribute 241 for the second user. In some embodiments, one (1) point may be assigned to each user attribute 241 that matches a POI attribute 226 of the selected POI 204. In some embodiments, a system user may be eliminated if that system user has preference within user attributes 241 that conflicts with a POI attribute 226.

In some embodiments, a user attribute 241 may be assigned a higher score even if a POI attribute 226 and/or user information 213 does not directly match the particular user attribute 241. For example, a POI attribute 226 corresponding to a price range that is lower than the preferred price range of a second user may be given a higher score because it is assumed that the second user would prefer paying less. In some embodiments, the aggregated score of a system user 212 may be a match percentage between the first user and the system user 212. Various matching algorithms can be used to aggregate scores for user attributes 241 of each system user 212 and/or filter out particular system users 212 based on the user preferences of the first user and/or POI attributes 241 of the determined POI 204. In other embodiments, the aggregated score may be further calculated based on other information, such as distance of a system user 212 from the POI 204.

Figure 2D:
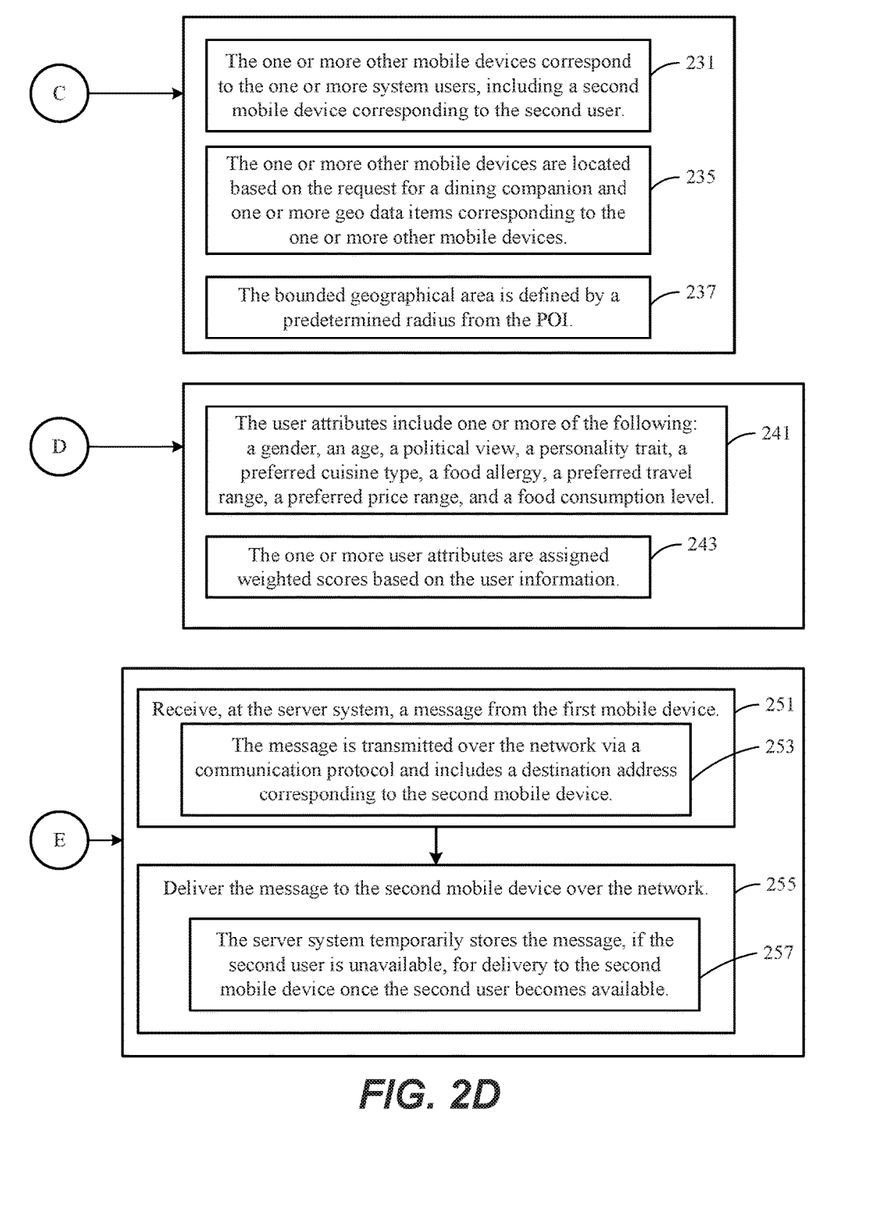

At operation 209, a connection between the first user and the second user is facilitated by the server system if the aggregated score corresponding to the second user meets a predetermined threshold. In some embodiments, operation 209 may be step 159 previously described in FIG. 1B. In some embodiments, the first user may be provided a ranked list of system users 212, including the second user, with scores above a predetermined threshold. By selecting a system user 212 from the list, the first user may view the network profile associated with the system user 212. The first user may then select a system user 212, such as the second user, to message about meeting for a meal.

In various embodiments, the connection is facilitated by receiving a message 253 from the first mobile device at the server system at operation 251. The message 253 may be transmitted over the network via a communication protocol and includes a destination address corresponding to the second mobile device. Communication protocols use in various implementations may include various Internet Protocol (IP) based protocols, such as Transmission Control Protocol (TCP) and/or User Datagram Protocol (UDP). Other communications protocols may be used in other embodiments, such as Internet Control Message Protocol (ICMP), Hypertext Transfer Protocol (HTTP), File Transfer Protocol (FTP), Internet Message Access Protocol (IMAP), etc. The message is then delivered to the second mobile device over the network at operation 255. In some embodiments, the message may be various types of messages, including instant messages, short message service (SMS)

messages, multimedia message service (MMS) messages, voice over IP (VoIP) messages, etc. utilizing one or more of the aforementioned communication protocols.

In some embodiments, the message may not be deliverable if the second user is not available, for example, if the application is closed on the second mobile device and no longer connected to server 112. In some embodiments, if the second user is unavailable, the server system may temporarily store (257) the message for delivery to the second mobile device once the second user becomes available. In some embodiments, the message may be stored on a local database or other database 116. In other embodiments, server 112 may deliver a push notification to a mobile device through an application notifying the corresponding system user 212 of a message.

In some embodiments, operations 201 to 209 of method 200, as previously described above, may be implemented for other system users 212, including the second user, that have transmitted requests 211 for a dining companion. As previously described, a system user 212 may also transmit data packets over network 110 via corresponding mobile devices 231, such as in operation 201. Like the data packets transmitted by the first mobile device, the data packets transmitted by the system user 212 may include a request for a dining companion (such as request 211), user information (such as user information 213) corresponding to the system user 212, and geo data items (such as geo data items 217). In some embodiments, geo data items 217 may be the same as and/or related to geo data items 235 corresponding to the one or more other mobile devices. As such, a POI 204 may be determined at operation 203 based on geo data items 217 and/or 235 corresponding to the mobile device 231 corresponding to the system user 212. Additionally, the first user may be located at operation 205 based on geo data items 217 and/or 235 corresponding to the first user. In some embodiments, user information 213 corresponding to the first user may additionally and/or alternatively include user attributes (such as user attributes 241) corresponding to the first user, such that the first user may be scored and ranked in operation 207. A connection may then be facilitated at operation 209 between the system user 212 and other system users 212. For example, a system user 212, including the second user, may transmit a message to another system user 212, including the first user.

In some embodiments, system users 212 that have transmitted requests 211 may be assigned higher rankings in operations 207. In some embodiments, method 200 may only be implemented to facilitate connections between system users 212 that have transmitted data packets including requests 211 for a dining companion in operation 201. For example, only system users 212 that have transmitted requests 211 may be located in operation 205.

Figure 3:
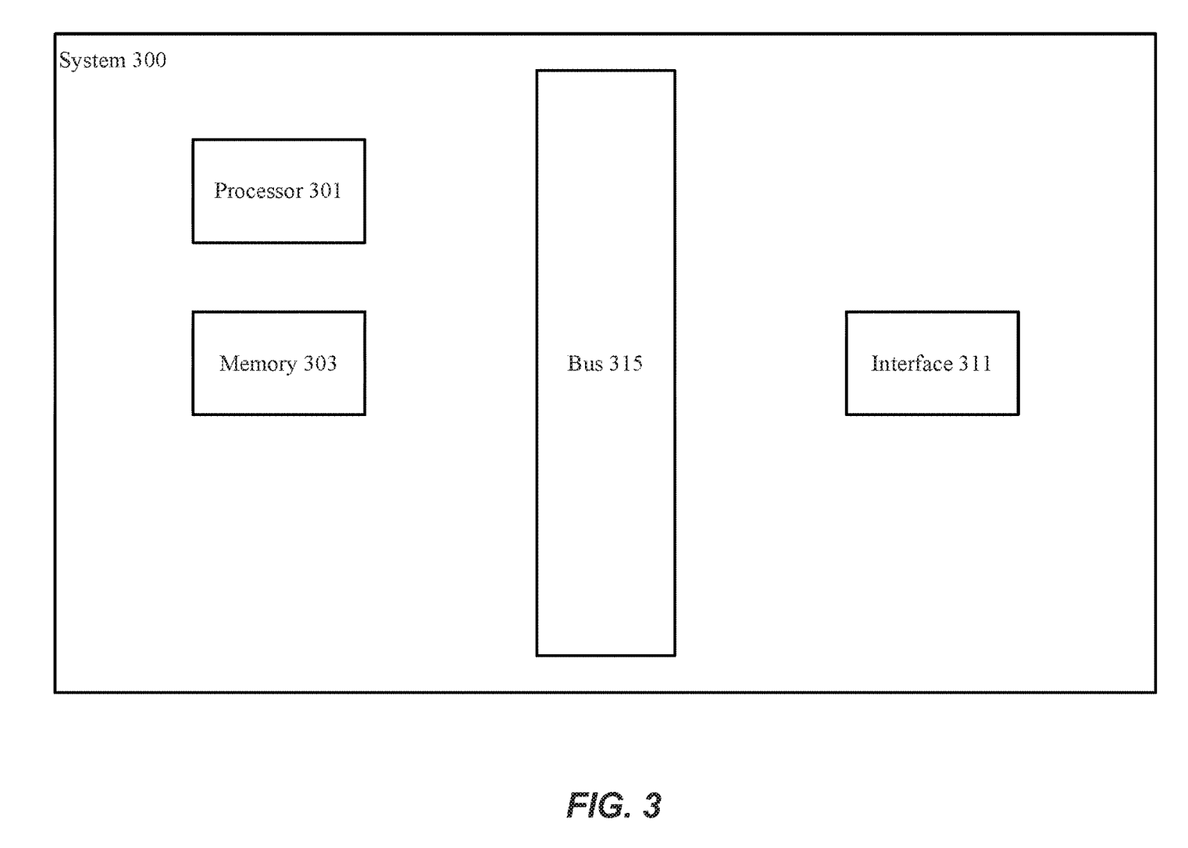
FIG. 3 illustrates one example of a system capable of implementing various processes described in the present disclosure.

FIG. 3 illustrates one example of a system capable of implementing various processes described in the present disclosure. In some embodiments, system 300 may be a client device, such as client device 102-108. In other embodiments, system 300 may be a server device, such as server 106. According to particular embodiments, a system 300, suitable for implementing particular embodiments of the present disclosure, includes a processor 301, a memory 303, an interface 311, and a bus 315 (e.g., a PCI bus or other interconnection fabric) and operates as a streaming server. In some embodiments, when acting under the control of appropriate software or firmware, the processor 301 is responsible for processing inputs through various computational layers and algorithms to extract condition information from images and other data. In other embodiments, the processor 301 is responsible for receiving diagnosis information from one or more databases and comparing the diagnosis information to the extracted condition information. Various specially configured devices can also be used in place of a processor 301 or in addition to processor 301. In other embodiments, system 300 may also include one or more of the following: an image capturing device, motion sensing components (e.g., accelerometer, gyroscope, compass), GPS components, a thermometer, etc.

The interface 311 is typically configured to send and receive data packets or data segments over a network, such as network 110. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 300 uses memory 303 to store data and program instructions for operations including determining a POI based on one or more geo data items (such as in operation 203), retrieving one or more POIs from a database (such as in operation 221), calculating an aggregated score for one or more POIs (such as in operation 225), prompting a user for a selection of a POI 204 (such as in operation 227), locating one or more other mobile devices 231 (such as in operation 205), calculating an aggregated score for one or more system users (such as in operation 207), and/or facilitating a connection between a first mobile device and a second mobile device (such as in operation 209). The program instructions may control the operation of an operating system and/or one or more applications, for example. Memory 303 may also be used to store network profile information including user information 213 and user attributes 241, as well as POI information including POI attributes 226. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 4:
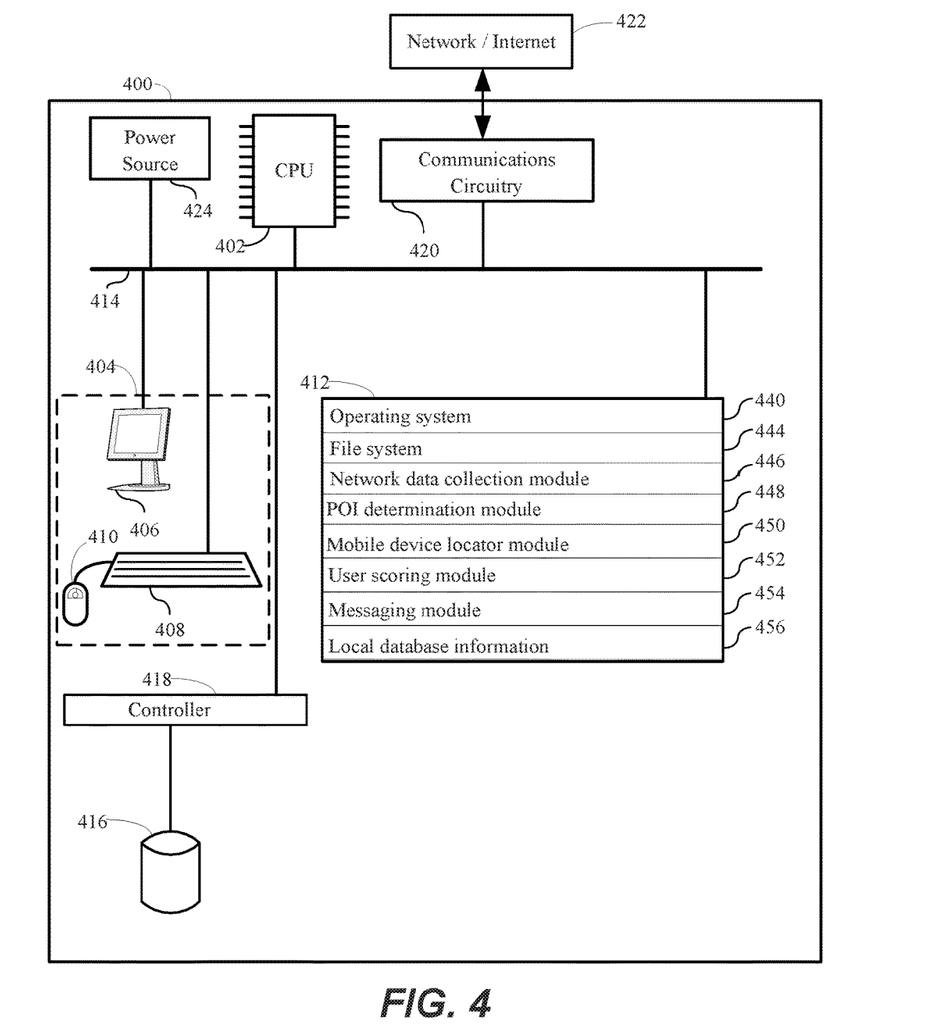
FIG. 4 is a block diagram illustrating an example of a computer system capable of implementing various processes described in the present disclosure.

FIG. 4 is a block diagram illustrating an example of a computer system capable of implementing various processes described in the present disclosure. The system 400 typically includes a power source 424; one or more processing units (CPU's) 402 for executing modules, programs and/or instructions stored in memory 412 and thereby performing processing operations; one or more network or other communications circuitry or interfaces 420 for communicating with a network 422; controller 418; and one or more communication buses 414 for interconnecting these components. In some embodiments, network 422 can be network 110, or another communication bus, the Internet, an Ethernet, an Intranet, other wide area networks, local area networks, and metropolitan area networks. Communication buses 414 optionally include circuitry (sometimes called a chipset) that interconnects and controls communications between system components. System 400 optionally includes a user interface 404 comprising a display device 406, a keyboard 408, and a mouse 410.

Memory 412 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 412 may optionally include one or more storage devices 416 remotely located from the CPU(s) 402. In some embodiments data stored in one or more storage devices 416 comprise a database, such as database 116, of POIs with corresponding geo-locations 219 and/or POI attributes 226.

Memory 412, or alternately the non-volatile memory device(s) within memory 412, comprises a non-transitory computer readable storage medium. In some embodiments, memory 412, or the computer readable storage medium of memory 412 stores the following programs, modules and data structures, or a subset thereof:
- an operating system 440 that includes procedures for handling various basic system services and for performing hardware dependent tasks;
- a file system 444 for storing various program files;
- a network data collection module 446 for collecting requests 211, user information 213, and/or geo data items 217 and 235 via one or more data packets over a network, such as network 110;
- a POI determination module 448 for determining a POI based one or more geo data items 217, such as in operations 203, 221, 225, and/or 227;
- a mobile device locator module 450 for locating one or more mobile devices within a bounded geographical area of the POI 20, such as in operation 205;
- a user scoring module 452 for calculating a score for one or more users, such as in operation 207;
- a messaging module 454 for facilitating connections between mobile devices connected through a network, such as in operation 209; and
- local database information 456 comprising network profile information, user information 213, geo-locations 219, POI information including POI attributes 226, user attributes 226, and/or network messages.

Each of the above identified elements may be stored in one or more of the previously mentioned memory devices, and corresponds to a set of instructions for performing a function described above. One or more of the above identified modules my operate by retrieving input from one or more mobile devices and/or one or more local storage 416 or other databases on network 422, such as database 116. The above identified modules or programs (i.e., sets of instructions) need not be implemented as separate software programs, procedures or modules, and thus various subsets of these modules may be combined or otherwise re-arranged in various embodiments. In some embodiments, memory 412 may store a subset of the modules and data structures identified above. Furthermore, memory 412 may store additional modules and data structures not described above.

Although FIG. 4 shows a "system for facilitating mobile device connections using geo data items," FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a presentation generation system and how features are allocated among them will vary from one implementation to another, and may depend in part on the amount of data traffic that the system must handle during peak usage periods as well as during average usage periods.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A method comprising:
   receiving, at a server system, one or more data packets transmitted over a network from a first mobile device corresponding to a first user, wherein the one or more data packets include:
   - a request for a dining companion from one or more system users, wherein the one or more system users includes a second user;
   - user information corresponding to the first user; and
   - one or more geo data items identifying a geo-location associated with the first user, wherein each geo data item identifies a geo-location based on at least one geo-coordinate;

determining, by a processor of the server system, a point-of-interest (POI) based on the one or more geo data items identifying the geo-location associated with the first user, wherein the POI is a restaurant;

locating, by the processor, one or more other mobile devices within a bounded geographical area of the POI, wherein the one or more other mobile devices correspond to the one or more system users, including a second mobile device corresponding to the second user,
   wherein the one or more other mobile devices are located based on the request for a dining companion and one or more geo data items corresponding to the one or more other mobile devices;

calculating, by the processor, an aggregated score for each system user from the one or more system users based on a plurality of user attributes, wherein one or more user attributes for each of the one or more system users are assigned weighted scores based on the first user information, wherein the weighted score for a user attribute is determined by examining the first user information, such that the assigned weighted scores for each user attribute are relevant only to the first user, and wherein the weighted scores for the user attributes are used to derive a single aggregated score for a potential second user that is indicative of whether a system user is a suitable dining companion for the first user; and facilitating, by the server system, a connection between the first user and the second user if the aggregated score corresponding to the second user meets a predetermined threshold.

2. The method of claim 1, wherein the user information includes one or more of the following data items:
a historical POI, temporal data, motion pattern data, wireless device information, temperature information, phone usage information, and one or more user preferences.

3. The method of claim 1, wherein the user attributes include one or more of the following:
a gender, an age, a political view, a personality trait, a preferred cuisine type, a food allergy, a preferred travel range, a preferred price range, and a food consumption level.

4. The method of claim 1, wherein the bounded geographical area is defined by a predetermined radius from the POI.

5. The method of claim 1, wherein the one or more geo data items identifying the geo-location associated with the first user are selected by the first user.

6. The method of claim 1, wherein determining the POI includes:
retrieving one or more POIs from a database based on the one or more geo data items identifying the geo-location associated with the first user, wherein the one or more POIs are located within a bounded geographical area corresponding to the identified geo-location associated with the first user;
calculating an aggregated score for each POI of the one or more POIs by assigning weighted scores to one or more POI attributes corresponding to the one or more POIs based on the user information; and
prompting the first user for a selection of a scored POI.

7. The method of claim 6, wherein POI attributes include one or more of the following:
a user rating, a cuisine type, a price range, an ambiance, operating hours, parking availability, a noise level, required attire, and accepted payment.

8. The method of claim 1, wherein facilitating a connection between the first user and the second user includes:
receiving, at the server system, a message from the first mobile device, wherein the message is transmitted over the network via a communication protocol and includes a destination address corresponding to the second mobile device; and
delivering the message to the second mobile device over the network, wherein the server system temporarily stores the message, if the second user is unavailable, for delivery to the second mobile device once the second user becomes available.

9. A system comprising:
a server including a processor and memory, wherein the server is configured to receive one or more data packets transmitted over a network from a first mobile device corresponding to a first user, the one or more data packets including:
a request for a dining companion from one or more system users, wherein the one or more system users includes a second user;
first user information corresponding to the first user; and
one or more geo data items identifying a geo-location associated with the first user, wherein each geo data item identifies a geo-location based on at least one geo-coordinate;
wherein the server is further configured to determine a point-of-interest (POI) based on the one or more geo data items identifying the geo-location associated with the first user, wherein the POI is a restaurant;
wherein a second mobile device, corresponding to the second user, within a bounded geographical area of the POI is located by the processor based on the request for a dining companion and one or more geo data items corresponding to the second mobile device;
wherein an aggregated score for the second user is calculated by the processor based on a plurality of user attributes corresponding to the second user, wherein one or more user attributes are assigned weights based on the first user information, wherein the weighted score for a user attribute is determined by examining the first user information, such that the assigned weighted scores for each user attribute are relevant only to the first user, and wherein the weighted scores for the user attributes are used to derive a single aggregated score for a potential second user that is indicative of whether a system user is a suitable dining companion for the first user;
wherein a connection between the first user and the second user is facilitated by the server if the aggregated score corresponding to the second user meets a predetermined threshold.

10. The system of claim 9, wherein the user information includes one or more of the following data items:
a historical POI, temporal data, motion pattern data, wireless device information, temperature information, phone usage information, and one or more user preferences.

11. The system of claim 9, wherein the user attributes include one or more of the following:
a gender, an age, a political view, a personality trait, a preferred cuisine type, a food allergy, a preferred travel range, a preferred price range, and a food consumption level.

12. The system of claim 9, wherein the bounded geographical area is defined by a predetermined radius from the POI.

13. The system of claim 9, wherein the one or more geo data items identifying the geo-location associated with the first user are selected by the first user.

14. The system of claim 9, wherein the server determines a POI by:
retrieving one or more POIs from a database based on the one or more geo data items identifying the geo-location associated with the first user, wherein the one or more POIs are located within a bounded geographical area corresponding to the identified geo-location associated with the first user;
calculating an aggregated score for each POI of the one or more POIs by assigning weighted scores to one or more POI attributes corresponding to the one or more POIs based on the user information; and
prompting the first user for a selection of a scored POI.

15. The system of claim 14, wherein POI attributes include one or more of the following:
a user rating, a cuisine type, a price range, an ambiance, operating hours, parking availability, a noise level, required attire, and accepted payment.

16. The system of claim 9, wherein the connection between the first user and the second user is facilitated by:
- receiving, at the server, a message from the first mobile device, wherein the message is transmitted over the network via a communication protocol and includes a destination address corresponding to the second mobile device; and
- delivering the message to the second mobile device over the network, wherein the server temporarily stores the message, if the second user is unavailable, for delivery to the second mobile device once the second user becomes available.

17. A non-transitory computer readable storage medium storing one or more programs configured for execution by a computer, the one or more programs comprising instructions for:
- receiving, at a server system, one or more data packets transmitted over a network from a first mobile device corresponding to a first user, wherein the one or more data packets include:
  - a request for a dining companion from one or more system users, wherein the one or more users includes a second user;
  - first user information corresponding to the first user; and
  - one or more geo data items identifying a geo-location associated with the first user, wherein each geo data item identifies a geo-location based on at least one geo-coordinate;
- determining, by a processor of the server system, a point-of-interest (POI) based on the one or more geo data items identifying the geo-location associated with the first user, wherein the POI is a restaurant;
- locating, by the processor, one or more other mobile devices within a bounded geographical area of the POI, wherein the one or more other mobile devices correspond to the one or more system users, including a second mobile device corresponding to the second user,
  - wherein the one or more other mobile devices are located based on the request for a dining companion and one or more geo data items corresponding to the one or more other mobile devices;
- calculating, by the processor, an aggregated score for each system user from the one or more system users based on a plurality of user attributes, wherein one or more user attributes for each of the one or more system users are assigned weighted scores based on the first user information wherein the weighted score for a user attribute is determined by examining the first user information, such that the assigned weighted scores for each user attribute are relevant only to the first user, and wherein the weighted scores for the user attributes are used to derive a single aggregated score for a potential second user that is indicative of whether a system user is a suitable dining companion for the first user; and
- facilitating, by the server system, a connection between the first user and the second user if the aggregated score corresponding to the second user meets a predetermined threshold.

18. The non-transitory computer readable storage medium of claim 17, wherein the bounded geographical area is defined by a predetermined radius from the POI.

19. The non-transitory computer readable storage medium of claim 17, wherein the one or more geo data items identifying the geo-location associated with the first user are selected by the first user.

20. The non-transitory computer readable storage medium of claim 17, wherein determining the POI includes:
- retrieving one or more POIs from a database based on the one or more geo data items identifying the geo-location associated with the first user, wherein the one or more POIs are located within a bounded geographical area corresponding to the identified geo-location associated with the first user;
- calculating an aggregated score for each POI of the one or more POIs by assigning weighted scores to one or more POI attributes corresponding to the one or more POIs based on the user information; and
- prompting the first user for a selection of a scored POI.

* * * * *